(12) United States Patent
Wiegand

(10) Patent No.: US 6,473,474 B1
(45) Date of Patent: Oct. 29, 2002

(54) WIDE BAND ALIAS RESOLVING DIGITALLY CHANNELIZED RECEIVER AND A MEMORY FOR USE THEREWITH

(75) Inventor: Richard J. Wiegand, Millersville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/133,479

(22) Filed: Aug. 12, 1998

(51) Int. Cl.[7] ................................................. H04B 1/10
(52) U.S. Cl. ........................ 375/350; 375/285; 375/349
(58) Field of Search ................................ 375/229, 260, 375/285, 340, 346, 349, 350, 377; 370/210, 343; 455/323, 243

(56) References Cited

U.S. PATENT DOCUMENTS

| | | | |
|---|---|---|---|
| 5,640,698 A | * | 6/1997 | Shen et al. .................. 455/323 |
| 5,867,479 A | * | 2/1999 | Butash ........................ 370/210 |
| 5,930,231 A | * | 7/1999 | Miller et al. ................ 370/210 |
| 6,085,077 A | * | 7/2000 | Fields et al. ................. 455/303 |
| 6,205,133 B1 | * | 3/2001 | Bexten ........................ 370/343 |

* cited by examiner

Primary Examiner—Stephen Chin
Assistant Examiner—Chieh M. Fan

(57) ABSTRACT

A real time channelized digital receiver partitions broad frequency bands into channels so that signals in each channel can be independently sensed or modulated. The digital receiver includes a high performance analog-to-digital converter that outputs a digital signal at a high clock rate and a Digital Signal Processor (DSP) that performs a real time channelization filtering operation at a slower clock rate. The DSP may use a multiplexer/demultiplexer approach to match unequal clock rates. The receiver can eliminate alias terms by improving Digital Radio Frequency Memories using quadrature processing with RF/IF mixers or digital processing to multiply the tones. The receivers and memories can also be improved with a homodyne operation that simplifies decimation and reconstitution for digital RF memory applications. Therefore, the digital receiver compensates for the clock rate differences between high speed converters and digital signal processors that perform real time channelization filtering and other signal processing functions.

20 Claims, 5 Drawing Sheets

WIDE BAND ALIAS RESOLVING DIGITALLY CHANNELIZED RECEIVER AND A MEMORY FOR USE THEREWITH

BACKGROUND OF THE INVENTION

1. Field of the Invention

The present invention is directed to providing wide band digital receivers.

2. Description of Related Art

In order to cover a broad frequency band, channelized architectures are employed. Channelization is the partitioning of the broad frequency bands into channels, so that signals in each channel can be sensed or modulated independent of what is happening to the other channels. Channelization is accomplished with digital filers.

The recent improvements in analog to digital converter clock rates and resolution mean that now wide band widths can be achieved. Likewise, the reduction in cost and increase in circuit density of digital signal processing components means that a practical channelization architecture can be achieved. However, these components are often not compatible with each other for many applications of interest, especially the electronic warfare applications. In particular, the specialized digital signal processing integrated circuits that perform the channelization filtering function cannot operate at as high a clock rate as the analog to digital converters or the digital to analog converters.

This inherent clock rate incompatibility was encountered earlier during the development of present day non-channelized digital RF memories (DRFM). In that case, the problem was that the analog to digital clock converter and the digital to analog converter clock rates were much higher than the clock rates of the memory chips.

Attempted solutions to this problem used demultiplexers and multiplexers to match clock rates. This approach worked because the spectral content of individual sections of memory were of no concern. The only thing that mattered was whether the full signal information could be written into and read out of the digital memory.

However, when used for the intended wide band digital receiver application, the conventional thinking is that demultiplexer and multiplexer operation is incompatible with channelized filtering because of aliasing. If done in real time, the demultiplexer function will lower the clock without changing the input signal frequency. This changes the relationship between the clock rate and the signal frequency components, meaning that the information content no longer satisfies the Nyquist limit criteria. Therefore, the data will include the input signal accompanied by false signals known as alias terms because there is insufficient information to describe the true signal unambiguously.

Another approach to solving certain clock rate difference problems is known as "decimation". Decimation is the selection of certain percentage of the data values, e.g., 1 out of 8 data values. Decimation allows memory and modulation functions to operate at lower clock rates without losing information for some applications, as discussed above. However, decimation is not an option for reducing the clock rate of the channelization filtering circuitry. Decimation of the data stream can only be accomplished after the filter operation, because the Nyquist limit is determined by the channel bandwidth and not the full bandwidth. So decimation can be used for some purposes, but not for the intended channelization filtering.

Another approach to solving clock rate difference problems is to avoid operating in real time. This approach puts the input signal into a buffer memory and then subsequently processes the signal in non-real time. However, the approach requires a detection of the presence of the signal so that signals can be directed to the memory, otherwise the memory would soon overflow. Accordingly, the receiver or receiver memory needs another receiver for assistance, and thus, the channelization implementation problem has not really been solved. Further, the receiver memories need to operate in real time and many receiver operations also need real time operation. Therefore, for many applications, non-real time operation is not a satisfactory solution.

Another approach for solving clock-rate difference problems is the "brute force" approach of faster digital signal processing integrated circuits. High performance analog to digital converters and digital to analog converters have been developed because there are many applications for them, and hence they are produced in large quantities. However, the large front-end development cost for the specialized digital processors needed for these digital filtering applications is difficult to justify because typically they have low-quantity production rates. Further, development of analog to digital convertors and digital to analog converters will continue, so there is a performance moving target.

Thus the dilemma still remains that even if dense circuit processors are designed to economically constitute many channel filters, a wide net input bandwidth results. However, a wide net input bandwidth requires a high clock rate for the channelizing digital filters in order to avoid the alias terms. But the digital processing technology is not compatible with such a high clock rate. The digital filter processing cannot be connected to the input analog to digital converter which is sampling the wide band. If the clock rate of the analog to digital converter is slowed, then the bandwidth is lost, and further, each analog to digital converter and digital to analog converter can no longer support many filtered channels.

Therefore, while the elements needed to meet the desired goals appear to be there individually, the incompatibility of clock rates make the goals achievement impractical.

SUMMARY OF THE PRESENT INVENTION

The present invention is intended to compensate for the clock rate differences between the analog to digital converters and the specialized digital signal processors that perform the channelization filtering and other signal processing functions.

Further scope of applicability of the present invention will become apparent from the detailed description given hereinafter. However, it should be understood that the detailed description and specific examples, while indicating preferred embodiments of the invention, are given by way of illustration only, since various changes in modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

Figure 1:
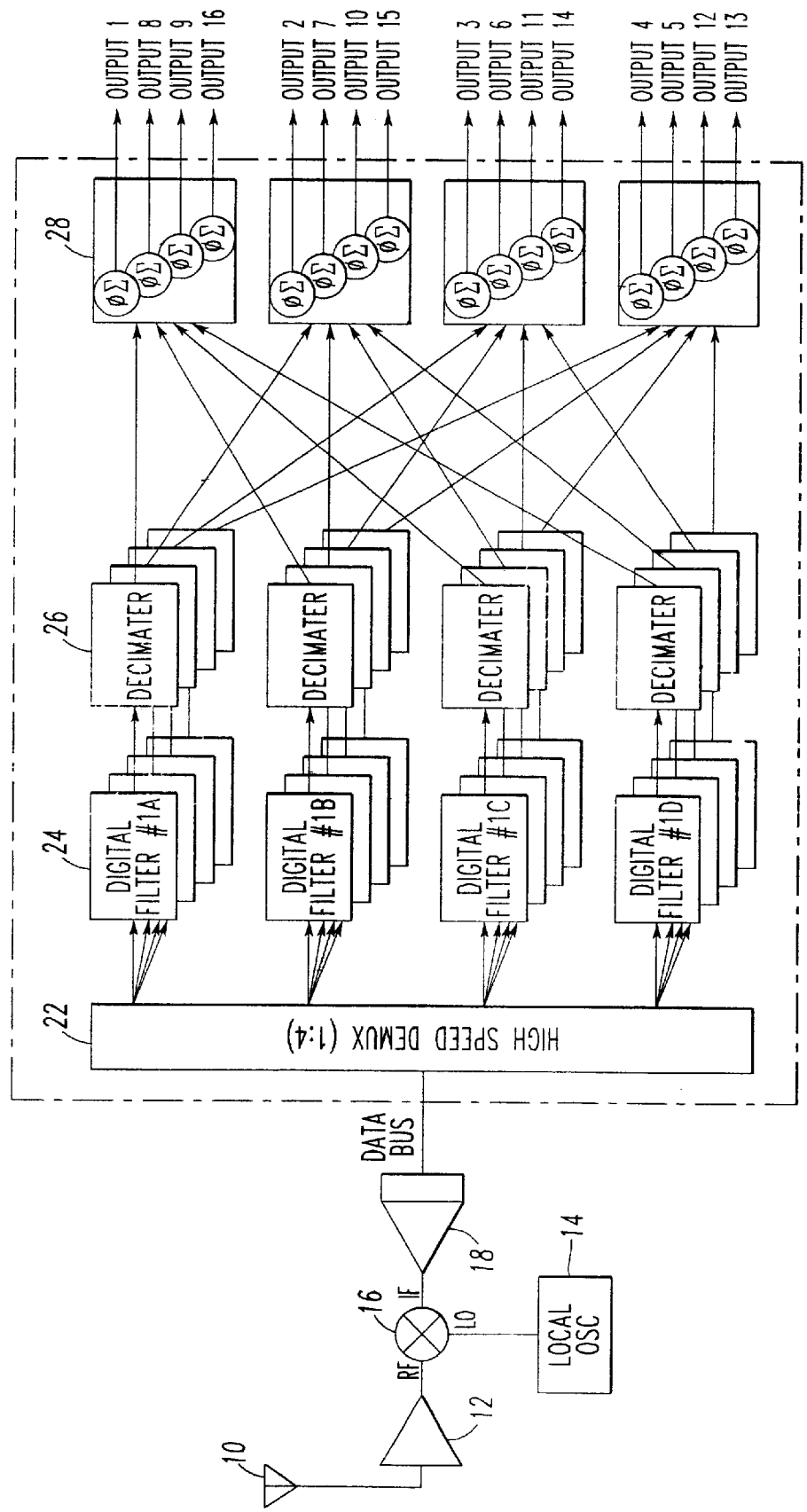
FIG. 1 illustrates a channelized digital receiver of the present invention.

FIG. 1 schematically shows a typical system front end applicable to the receiver of the present invention. This system includes: an antenna 10, a preamplifier 12, a local oscillator 14, and a mixer 16 receiving the amplified signal and the local oscillator signal for outputting this product to an analog to digital converter 18 and the digital signal processing (DSP) device 20. The DSP 20 includes: a high speed demultiplexer 22, a series of digital filters 24, a series of decimeters 26, and a series of vector phase shifters and adders 28. The multiple output signal lines in FIG. 1 feed digital detection circuits (not shown).

FIG. 1 shows the hardware for the specific case where a 1:4 demultiplexer is appropriate to match clock rates. This concept can be extended to other appropriate ratios. The analog to digital converter 18 operates four times faster than the digital filter.

Figure 2:
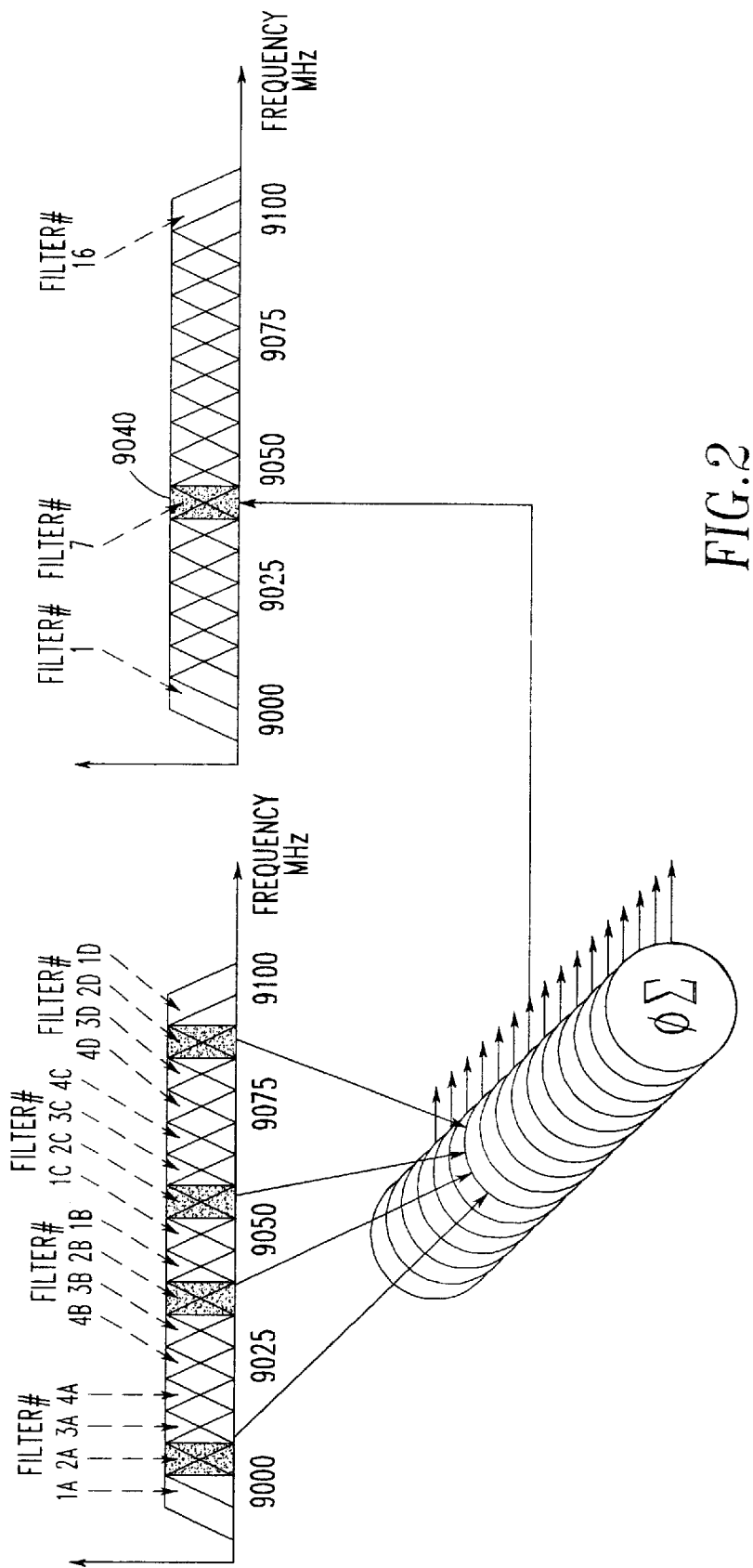
FIG. 2 illustrates a spectral channelization partitioning of the receiver shown in FIG. 1.

FIG. 2 shows an example frequency partitioning when the analog to digital converter 18 operates at a 200 MHz clock rate and the digital signal processing circuitry operates at a 50 MHz clock rate. The filters are numbered 1–4 inclusive, each in one of the four banks designated as "A" through "D" inclusive, totalling 16 actual filters. The vector addition of the individually-phase shifted sets of the hardware-filter outputs produce the effective filter outputs shown at the right-sided partitioning, and numbered 1 through 16. It can be seen from FIG. 2 that a single input will output from 4 actual filters because of aliasing, but output only from one effective filter, the correct one as discussed below.

In order to more clearly disclose the details of the processing that converts the actual filter outputs to the effective filter outputs, this processing documented in FIGS. 1–3 and discussed below uses effective filter #7 as an example. Effective filter #7 is made by adding actual filter 2A output, phase shifted by minus three delta minus ½π, plus the output of the actual filter 2B, phase shifted by minus 2 delta minus π, plus actual filter 2C output, phase shifted by minus delta plus ½π, plus the output of filter 2D with no phase shift. "Delta" is two times π times the actual filter center frequency normalized to the clock rate. This phase shift documentation is set forth in table 1 below.

TABLE 1

| Channelized DRFM Phase-Shift Documentation | | | |
|---|---|---|---|
| Path | Phase Shift | Path | Phase Shift |
| A → 1.8.9.16 | .3Δ | 1.8.9.15 → A | .3Δ |
| B → 1.8.9.16 | .2Δ | 2.7.10.15 → A | .3Δ · κ/2 |
| C → 1.8.9.16 | .1Δ | 3.6.11.14 → A | .3Δ + κ/2 |
| D → 1.8.9.16 | 0 | 4.5.12.13 → A | .3Δ + κ |
| A → 2.7.10.15 | .3Δ · κ/2 | 1.8.9.16 → B | .2Δ |
| B → 2.7.10.15 | .2Δ · κ | 2.7.10.15 → B | .2Δ · κ |
| C → 2.7.10.15 | .1Δ + κ/2 | 3.6.11.14 → B | .2Δ + κ |
| D → 2.7.10.15 | 0 | 4.5.12.13 → B | .2Δ |
| A → 3.6.11.14 | .3Δ + κ/2 | 1.8.9.15 → C | .1Δ |
| B → 3.6.11.14 | .2Δ + κ | 2.7.10.15 → C | .1Δ + κ/2 |

TABLE 1-continued

| Channelized DRFM Phase-Shift Documentation | | | |
|---|---|---|---|
| Path | Phase Shift | Path | Phase Shift |
| C → 3.6.11.14 | .1Δ · κ/2 | 3.6.11.14 → C | .1Δ · κ/2 |
| D → 3.6.11.14 | 0 | 4.5.12.13 → C | .1Δ + κ |
| A → 4.5.12.13 | .3Δ + κ | 1.8.9.16 → D | 0 |
| B → 4.5.12.13 | .2Δ | 2.7.10.15 → D | 0 |
| C → 4.5.12.13 | .1Δ + κ | 3.6.11.14 → D | 0 |
| D → 4.5.12.13 | 0 | 4.5.12.13 → D | 0 |

The values set forth in the table are based on the assumption that a feed forward averaging homodyne structure low pass filter is employed. In such a filter structure, there is a digital local oscillator used to beat or multiply the input band to the zero center frequency band. For the FIG. 1 example parameters, these four local oscillators frequencies would be 3.125 MHz for filters 1A–1D; 3.125+6.25 equals 9.375 MHz for filters 2A–2D; 3.125 plus 2×6.25 equals 15.625 MHz for filters 3A–3D; and 3.125 plus 3×6.25 equals 21.875 MHz for filters 4A–4D. The four local oscillators would be clocked at 50 MHz, the rate coming from each of the demultiplexer legs.

Continuing this example, the values of the delta phase shift used in the relationships in the table, would be 3.125/200×360 equals 5.625 degrees for outputs 1, 8, 9 and 16 from 1A–1D respectively; 9.375/200 times 360 equals 16.875 degrees for outputs 2, 7, 10 and 15 from 2A–2D respectively; .15.625/200 times 360 equals 28.125 degrees for outputs 3, 6, 11 and 14 for 3A–3D respectively; and 21.875/200 times 360 equals 39.375 degrees for outputs 4,5, 12 and 13 from 4A–4D respectively. As illustrated, the total bandwidth is 16 times 6.25 equals 100 MHz. The 16 effective RF filter centers are 1) 9003.125 MHz; 2) 9009.375 MHz; 3) 9015.625 MHz; 4) 9021.875 MHz; 5) 9028.125 MHz, . . . , 15) 9090.625 MHz and 16) 9096.875 MHz.

The most important purpose for using channelization is to give the system the capability to handle simultaneous overlap signals randomly positioned within the full instantaneous bandwidth. The above solution is compatible with these requirement since the processing of the present invention exploits the principle of superposition which is preserved for linear processes. None of the above described processing uses non-linear signal processing.

Figure 3:
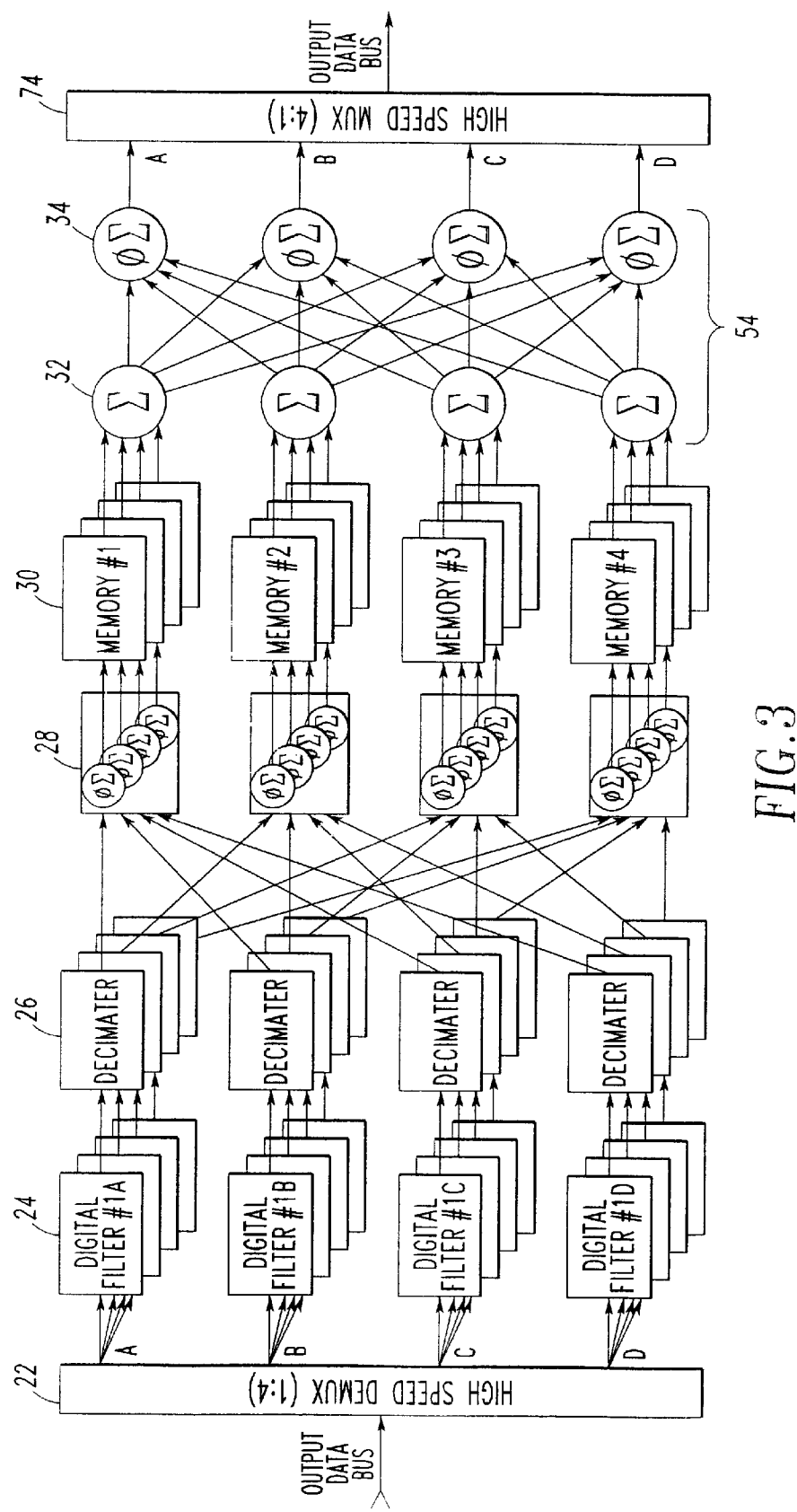
FIG. 3 illustrates a digital memory for use with a receiver shown in FIG. 1.

FIG. 3 shows the same approach used for a non-receiver application; the Coherent Digital Exciter. The exciter is used to impose programmable delay on a channelized basis. Note that in FIG. 3, no decimeter is needed for the memory implementation. For the memory 30, the data rate will be restored at the input of the multiplexer. No separate block is shown for restitution since the data value is simply replicated.

Decimation is the reduction in data rate allowed once the bandwidth has been reduced by the channelization filtering. Decimation is optional and will likely be used for the receiver application, but the appropriateness of decimation is not clear for the memory application. If the data rate needs to be reduced for the memory, it may be more cost effective to simply extend the Wideband Alias Resolving Digital (WARD) concept with higher ratios of, or staged sets of, the multiplexer and demultiplexer circuits.

Figure 4A:
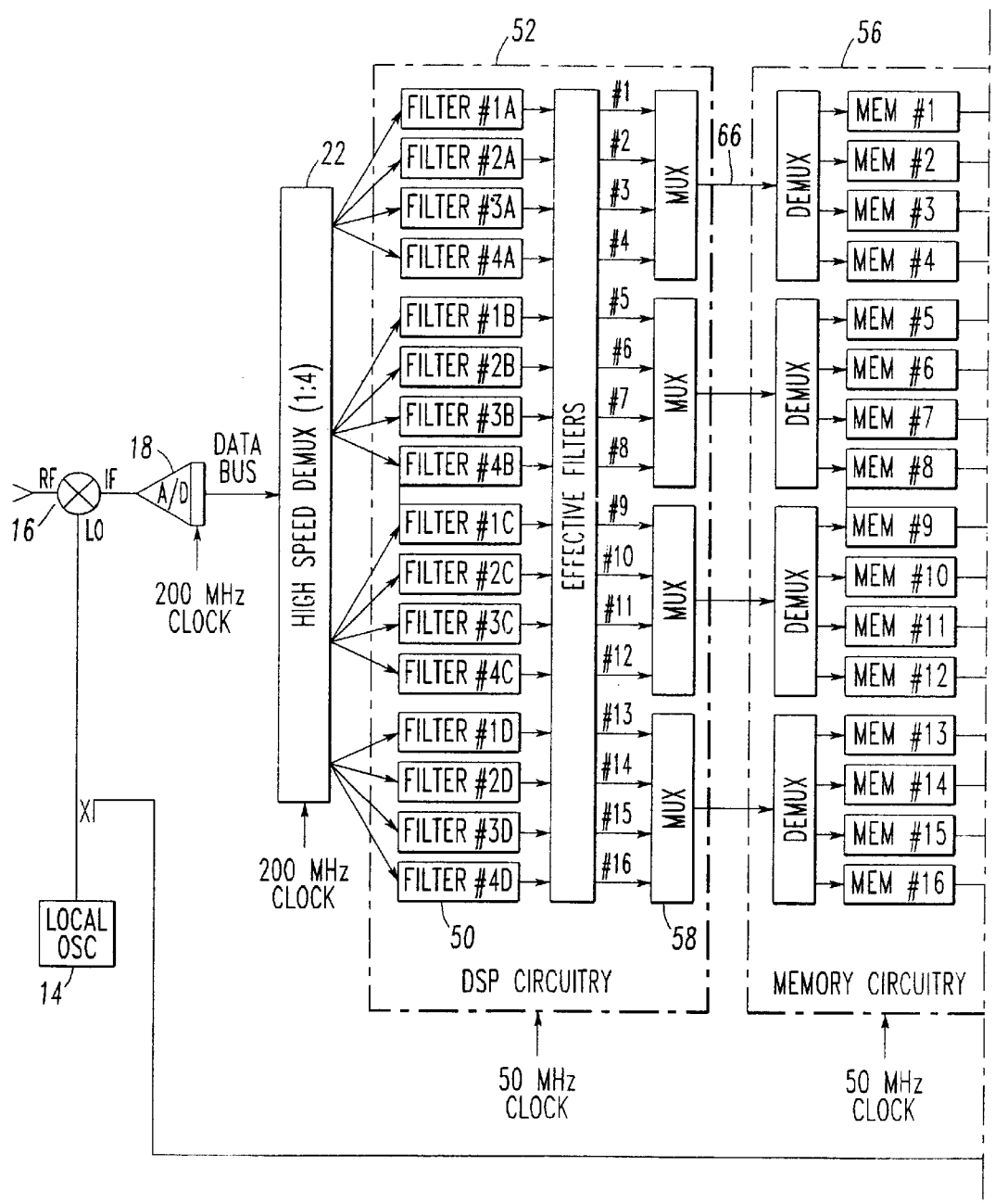
FIGS. 4A and 4B illustrate another more complete configuration of the coherent digital memory system.
Figure 4B:
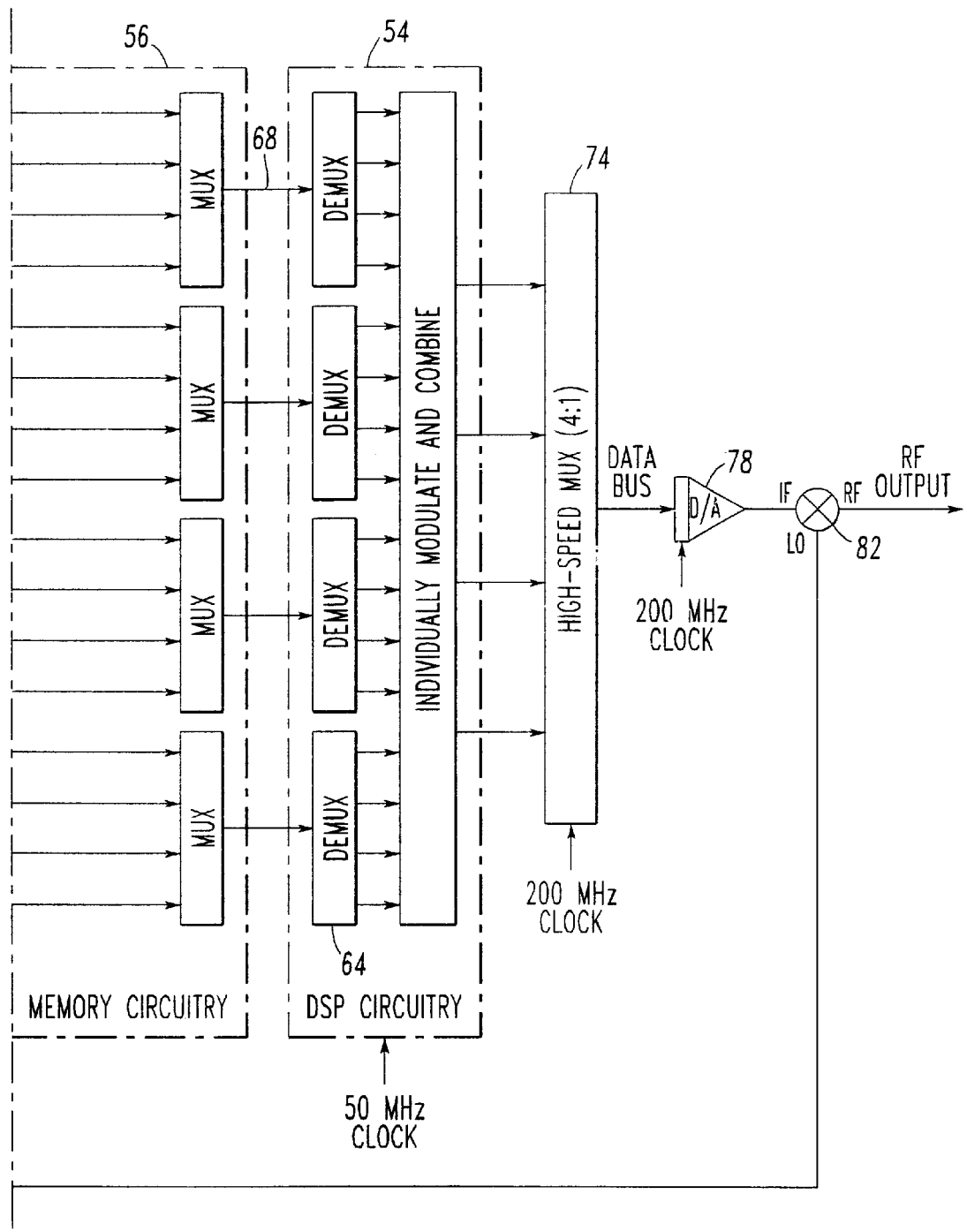

FIGS. 4A and 4B show additional features that may be incorporated into a Coherent Digital Exciter of the present invention. This Coherent Digital Exciter has the ability to modulate signals on a channelized basis. First, the WARD concept requires phase shifting the signal. This implies that the input needs to be characterized as quadrature component or complex number data rather than scaler or single component data. As shown in FIGS. 4A and 4B this conversion to quadrature input can either be accomplished with analog components in the radio frequency/intermediate frequency (RF/IF) mixer or can be accomplished in digital processing as part of the actual filter. If done digitally, the bus formats will change, but neither the bus size or bus clock rate needs to be increased because the net information flow has not been changed.

The high speed DEMUX 22, MUX 74, A/D converter 18 and D/A converter 78 operate at a high speed clock rate, for example, about 200 MHz. Meanwhile, the DSP circuitry 52, 54 operates at a slower clock rate, for example, 50 MHz. The memory circuitry 56 operates at the slower clock rate (i.e., 50 MHz) but can clock lower than the clock rate of the DSP circuitry 52, 54 if decimation is used, or if the memory circuitry 56 is subdivided with additional DEMUX 60 or MUX 62 circuits. The data buses 66 and 68 located between the DSP circuitry 52, 54 and memory circuitry 56 can pass four filter channels each at the clock rate of the memory circuit 56.

One convenient digital filter approach is to design all the actual digital filters 50 as low pass filters. This is done, within each filter 50, by multiplying the input by a single tone centered at the desired filter position in frequency. The subsequent processing is known as homodyne processing. Homodyne operation allows decimation and reconstitution to be accomplished very simply. If done on a non-homodyne direct frequency input basis, decimation itself requires complicated circuitry. For the digital receiver application, homodyne operations allow decimation to be accomplished with a single gate. For the coherent memory application, homodyne operation allows decimation to be accomplished with the simple multiplexer.

In the coherent channelized digital memory technology, the more channels the better, provided the cost is not too large. The digital signal processing circuits 52, 54 and the memory circuits 56 may be fabricated using distinct fabrication technology. Even if they are not, economic considerations may necessitate that the functions be in separate integrated circuits. Hence, the digital signal processing circuits 52,54 and the memory circuits 56 will likely be in a separate module, as shown in FIGS. 4A and 4B.

The problem is that increasing the number of channels may make a mechanical packaging nightmare to accommodate all the internal interface BUSs. The solution is to further multiplex and demultiplex as shown in FIGS. 4A and 4B. No information will be lost by doing so, and as long as the multiplex circuits 58, 62 and demultiplex circuits 60, 64 are small, the data transfer would be much more efficient in terms of mechanical packing. In FIGS. 4A and 4B, every BUS 66, 68 is passing the maximum information content allowed by its clock rate.

If homodyne operation is used, a single tone is employed to shift the channel center frequency to zero frequency as discussed above. However, it is more efficient to apply the needed modulation to that tone, and hence indirectly to the signal path, than to apply the modulation directly to the signal path. That is because the (percentage) uncertainty bandwidth of the tone is nil, but is substantial for the direct signal path. FIGS. 4A and 4B show the modulation applied, after the memory, in the channel combining circuitry of the second tone multiply which reconverts back to the original direct frequency.

The channelized digital receiver has a wide instantaneous bandwidth (IBW), but is able to make frequency selective (narrow-band) detections and measurements in a staring mode that is not subject to mutual-signal interference within its dynamic range. That is, each channel operates as an independent receiver, despite considerable common circuitry. The channelized digital rate of the coherent frequency memory application also has a wide IBW and is able to perform frequency-selective (narrow-band) coherent delay and modulation functions in a staring mode that is not subject to mutual-signal interference within its dynamic range. That is, each channel operates as an independent (delay and) modulator, despite considerable common circuitry.

The channelized digital receiver and coherent digital radio frequency memory, such as memory circuitry 56, include all the benefits of a channelized architecture, including the functional benefit of channel independence and the cost benefit of considerable common circuitry. The number of effective filters 66 is the same as the number of actual filters 50, provided all channels have the same IBW.

The channelized digital receiver and coherent digital radio frequency memory both exhibit the cost effective benefit of being able to utilize analog-to-digital converter and digital-to-analog converter components based on their bandwidth and dynamic range, and utilize digital-filter integrated circuits based on their filter-circuit density without being constrained because the digital components do not have compatible clock rates. This results in the further benefits of the ability to quickly and inexpensively make demonstration breadboards/prototypes, reduced final design development cost, improved production cost-effectiveness, and ease of adapting the design to the evolving performance of key components.

In digital processing systems, the only normal ways to match unequal clock rates are ineffective because of aliasing or the loss of real-time operation, and because of production and developments costs. To solve aforementioned problem, the invention uses a demultiplexer approach but nevertheless eliminates the alias terms with relatively simple additional processing.

Digital receivers and digital radio frequency memories can be improved by converting to quadrature processing with RF/IF mixers or alternatively with digital processing by multiplying by tones. The receivers and memories can also be improved with a homodyne operation that will simplify decimation and reconstitution for digital RF memory applications.

Channelized digital RF memories can be improved by additional multiplexer and demultiplexer elements to make the physical size of the internal bus interfaces independent of the number of channels. Non-channelized and channelized digital RF memories can be improved by imposing the needed modulation indirectly instead of directly, and is especially appropriate when operated in conjunction with a homodyne structure.

The invention being thus described, it will be obvious that the same may be varied in many ways. For example, the concept inherent in the specific examples can be applied to other clock-rate ratios. Such variations are not to be regarded as a departure from the spirit and scope of the invention, and all such modifications as would be obvious to one skilled in the art are intended to be included within the scope of the following claims.

What is claimed is:

1. A digital channelized processor comprising:
 a signal translating circuit that receives an input signal and outputs a translated signal at a first clock rate;
 a digital signal processing device that receives the translated signal, performs a real time channelization filtering operation at a second clock rate slower than the first clock rate and outputs a plurality of effective filter signals;
 wherein the digital signal processing device further comprises a demultiplexer that separates the translated signal into a plurality of channelized signals and including,
 a plurality of digital filters that receive the channelized signals and output a plurality of actual filter signals,
 respective circuits that selectively shift the phase of the actual filter signals by a predetermined amount or provides no phase shift of the actual filter signals, and
 a signal summer that then adds said actual filter signals and outputs one or more effective filter signals.

2. The digital channelized processor as recited in claim 1, wherein the digital signal processing device further includes a plurality of decimators that reduces a data rate of the actual filter signals.

3. The digital channelized processor as recited in claim 1, wherein the digital filters are low pass filters that operate using a homodyne structure for accomplishing decimation and reconstitution.

4. The digital channelized processor as recited in claim 1, further comprising a memory circuit that stores the effective filter signals and outputs stored channelized filter signals at the second clock rate or a third clock rate lower than said second clock rate, and
 a second digital signal processing device that modulates and combines the channelized filter signals to output a plurality of combined signals to a multiplexer operating at the first clock rate.

5. The digital channelized processor as recited in claim 1, wherein the digital filters are low pass filters implemented by multiplying the channelized signals by a tone centered at the desired filter position in frequency.

6. The digital channelized processor as recited in claim 1, wherein the signal translating circuit is an analog-to-digital converter.

7. The digital channelized processor as recited in claim 1, further comprising a mixer that outputs a product of a pre-input signal and an oscillator signal to the signal translating circuit as the input signal.

8. The digital channelized processor as recited in claim 1, further comprising a memory circuit that stores the effective filter signals.

9. The digital channelized processor as recited in claim 8, further comprising a phase shifter that shifts the phase of the stored effective filter signals and a second signal summer that sums the shifted stored effective filter signals at the second clock rate.

10. The digital channelized processor as recited in claim 9, further comprising a second signal translating circuit that combines the summed shifted stored effective filter signals and outputs a modulated output signal at the first clock rate.

11. The digital channelized processor as recited in claim 8, wherein the memory circuit stores the effective filter signals at the second clock rate or at a third clock rate slower than the second clock rate.

12. The digital channelized processor as recited in claim 1, wherein the input signal includes quadrature component or complex number data.

13. A digital channelized processor comprising:
 signal translating means for receiving an input signal and outputting a translated signal at a first clock rate;
 digital signal processing means for receiving the translated signal, performing a real time channelization filtering operation at a second clock rate slower than the first clock rate and outputting a plurality of effective filter signals;
 wherein the digital signal processing means further comprises demultiplexing means for separating the translated signal into a plurality of channelized signals and including,
 filtering means for receiving the channelized signals and outputting a plurality of actual filter signals,
 means for selectively shifting the phase of the actual filter signals by a predetermined amount or providing no phase shift of the actual filter signals, and
 means for summing the actual filter signals and outputting one or more the effective filter signals.

14. A method for modulating an input signal with a digital channelized processor comprising the steps of:
 (a) receiving an input signal and outputting a translated signal at a first clock rate;
 (b) receiving the translated signal, performing a real time channelization filtering operation at a second clock rate slower than the first clock rate, and outputting a plurality of effective filter signals; and
 wherein step (b) includes the steps of, (i) separating the translated signal into a plurality of channelized signals, (ii) digitally filtering the channelized signals, (iii) generating a plurality of actual filter signals, (iv) selectively shifting or non-shifting the phase of the actual filter signals, and (v) following step (iv) summing the actual filter signals and outputting at least one effective filter signal.

15. A digital channelized processor comprising:
 a signal translating circuit that receives an input signal and outputs a translated signal at a first clock rate;
 a digital signal processing device that receives the translated signal, performs a real time channelization filtering operation at a second clock rate slower than the first clock rate and outputs a plurality of effective filter signals;
 a memory circuit that stores the effective filter signals; and
 a phase shifter that shifts the phase of the stored effective filter signals,
 an adder that sums the shifted stored effective filter signals at the second clock rate.

16. The digital channelized processor as recited in claim 15 and further comprising:
 another signal translating circuit that combines the summed shifted stored effective filter signals and generates an output signal at the first clock rate.

17. A digital channelized processor comprising:
 a first signal translating circuit that receives an input signal and outputs a translated signal at a first clock rate;
 a digital signal processing circuit that receives the translated signal, performs a real time channelization filtering operation at a second clock rate slower than the first clock rate and outputs a plurality of effective filter signals;
 a demultiplexer that separates the translated signal into a plurality of channelized signals and including, a plurality of digital filters that receive the channelized signals and output a plurality of actual filter signals, respective circuits that selectively shift the phase of the actual filter signals by a predetermined amount or provides zero phase shift of the actual filter signals, a signal summer that then adds said actual filter signals and outputs one or more effective filter signals;

a memory that stores said one or more effective filter signals at said second clock rate;

a circuit that shifts the phase of the stored effective filter signals, an adder that sums the shifted stored effective filter signals at the second clock rate, and a second signal translating circuit that combines the summed shifted stored effective filter signals and outputs a modulated output signal at the first clock rate.

18. A digital channelized processor comprising:

signal translating means for receiving an input signal and outputting a translated signal at a first clock rate;

digital signal processing means for receiving the translated signal, performing a real time channelization filtering operation at a second clock rate slower than the first clock rate and outputting a plurality of effective filter signals;

wherein the digital signal processing means further comprises demultiplexing means for separating the translated signal into a plurality of channelized signals and including, filtering means for receiving the channelized signals and outputting a plurality of actual filter signals;

means for selectively shifting the phase of the actual filter signals by a predetermined amount or providing no phase shift of the actual filter signals, adding means for then summing the actual filter signals and outputting one or more the effective filter signals;

memory means for storing said one or more effective filter signals at the second clock rate or at a third clock rate slower than the second clock rate;

another means for shifting the phase of the stored effective filter signals by a predetermined amount, and another adding means for summing the shifted stored effective filter signals at the second clock rate.

19. The digital channelized processor as recited in claim 18, and further comprising signal translating means for combining the summed shifted stored effective filter signals and outputting a modulated output signal at the first clock rate.

20. A method for modulating an input signal with a digital channelized processor comprising the steps of:

(a) receiving an input signal and outputting a translated signal at a first clock rate;

(b) receiving the translated signal, performing a real time channelization filtering operation at a second clock rate slower than the first clock rate, and outputting a plurality of effective filter signals; wherein step (b) includes the steps of, (i) separating the translated signal into a plurality of channelized signals, (ii) digitally filtering the channelized signals, (iii) generating a plurality of actual filter signals, (iv) selectively shifting or non-shifting the phase of the actual filter signals, and (v) following step (iv) summing the actual filter signals and outputting one or more effective filter signals;

(c) storing the effective filter signals in a memory at said second clock rate or at a third clock rate slower than the second clock rate;

(d) shifting the phase of the stored effective filter signals and summing the shifted stored effective filter signals at the second clock rate; and (e) translating the summed shifted stored effective filter signals and outputting a modulated output signal at the first clock rate.

* * * * *